US010657148B2

(12) United States Patent
Hamilton, II et al.

(10) Patent No.: US 10,657,148 B2
(45) Date of Patent: *May 19, 2020

(54) ACCESSING A LATEST VERSION OF DOCUMENTATION FOR AN IOT DEVICE

(71) Applicant: International Business Machines Corporation, Armonk, NY (US)

(72) Inventors: Rick A. Hamilton, II, Charlottesville, VA (US); Agueda Martinez Hernandez Magro, Zapopan (MX); Jose Roberto Mosqueda Mejia, Puruandiro (MX); Victor Adrian Sosa Herrera, Tlaquepaque (MX)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 329 days.

This patent is subject to a terminal disclaimer.

(21) Appl. No.: 15/582,160

(22) Filed: Apr. 28, 2017

(65) Prior Publication Data

US 2018/0314743 A1 Nov. 1, 2018

(51) Int. Cl.
*G06F 17/00* (2019.01)
*G06F 16/248* (2019.01)
(Continued)

(52) U.S. Cl.
CPC ......... *G06F 16/248* (2019.01); *G06F 9/453* (2018.02); *G06F 16/2474* (2019.01);
(Continued)

(58) Field of Classification Search
CPC .................. G06F 16/248; G06F 16/3337
See application file for complete search history.

(56) References Cited

U.S. PATENT DOCUMENTS

| 6,311,180 B1 * | 10/2001 | Fogarty ............... G06F 16/9577 |
| | | 707/749 |
| 2004/0088695 A1 * | 5/2004 | Kawano ................... G06F 8/65 |
| | | 717/171 |

(Continued)

FOREIGN PATENT DOCUMENTS

WO 2014053048 A1 4/2014

OTHER PUBLICATIONS

Schenkluhn, S., "Device and Event Management as Foundation of IoT Applications," [online] Copyright © 2010-2017 Bosch ConnectedWorld Blog | Bosch Software Innovations, Aug. 9, 2014 [retrieved Apr. 27, 2017], retrieved from the Internet: <http://blog.bosch-si.com/categories/technology/2014/09/device-and-event-management-as-foundation-of-iot-applications/>, 3 pg.

(Continued)

*Primary Examiner* — Syed H Hasan
(74) *Attorney, Agent, or Firm* — Cuenot, Forsythe & Kim, LLC

(57) ABSTRACT

An IoT apparatus in use by a user, which is communicatively linked to a mobile device used by the user, is identified. A determination can be made as to whether documentation for the IoT apparatus is located on the IoT apparatus or on a mobile device. Responsive to determining that the documentation is located on the IoT apparatus or on the mobile device, a determination can be made as to whether the documentation located on the IoT apparatus or on the mobile device is a latest version of the documentation. Responsive to determining that the documentation located on the IoT apparatus or on the mobile device is not the latest version of the documentation, the latest version of the documentation can be automatically accessed from a resource external to the IoT apparatus and the mobile device. Presentation of the latest version of the documentation on a display can be initiated.

14 Claims, 7 Drawing Sheets

(51) Int. Cl.
*G06F 17/22* (2006.01)
*G06F 16/93* (2019.01)
*G06F 16/2458* (2019.01)
*G06F 16/33* (2019.01)
*G06F 9/451* (2018.01)

(52) U.S. Cl.
CPC .......... *G06F 16/3337* (2019.01); *G06F 16/93* (2019.01); *G06F 17/2288* (2013.01)

(56) References Cited

U.S. PATENT DOCUMENTS

| | | | | |
|---|---|---|---|---|
| 2004/0249821 | A1* | 12/2004 | Nies | G06Q 10/10 |
| 2006/0259902 | A1* | 11/2006 | Lin | G06F 8/65 |
| | | | | 717/168 |
| 2014/0241354 | A1* | 8/2014 | Shuman | H04L 67/16 |
| | | | | 370/390 |
| 2016/0147498 | A1 | 5/2016 | Son et al. | |
| 2016/0156575 | A1 | 6/2016 | Jeong et al. | |

OTHER PUBLICATIONS

"Discover IFTTT and Applets—IFTTT," [online] IFTTT [retrieved Apr. 27, 2017], retrieved from the Internet: <https:ifttt.com/discover>, 6 pg.

"IBM—Watson Internet of things Platform," [online] IBM Software, IBM Corporation [retrieved Apr. 27, 2017], retrieved from the Internet: <http://www-03.ibm.com/software/products/en/internet-of-things-platform>, 3 pg.

"IBM Watson IoT Platform," [online] IBM Software, IBM Corporation [retrieved Apr. 27, 2017], retrieved from the Internet: <https://internetofthings.ibmcloud.com/#/>, 8 pg.

Hamilton, II, R.A., et al., "Accessing a Latest Version of Documentation for an IoT Device," U.S. Appl. No. 16/177,227, filed Oct. 31, 2018, 32 pages.

Oct. 31, 2018, U.S. Appl. No. 16/177,227.

* cited by examiner

600

```
Identify an IoT apparatus in use by a user and that is communicatively linked to a
mobile device used by the user
602
```
↓
```
Determine whether documentation for the IoT apparatus is located on the IoT
apparatus or on the mobile device
604
```
↓
```
Responsive to determining that the documentation for the IoT apparatus is
located on the IoT apparatus or on the mobile device, determine whether the
documentation for the IoT apparatus located on the IoT apparatus or on the
mobile device is a latest version of the documentation
606
```
↓
```
Responsive to determining that the documentation for the IoT apparatus located
on the IoT apparatus or on the mobile device is not the latest version of the
documentation, automatically access, using a processor, the latest version of the
documentation from at least one resource external to the IoT apparatus and the
mobile device
608
```
↓
```
Initiate presentation at least a portion of the latest version of the documentation
on a display
610
```

ACCESSING A LATEST VERSION OF DOCUMENTATION FOR AN IOT DEVICE

BACKGROUND

The present invention relates to the Internet of Things (IoT), and more specifically, to IoT devices.

The IoT is the inter-networking of physical devices embedded with electronics, software and network connectivity that enable these devices to collect and exchange data. The IoT allows devices to communicate, and in some cases to be remotely sensed or controlled, across existing network infrastructure. This creates opportunities for more direct integration of various devices into computer-based systems, resulting in improved efficiency, accuracy and economic benefit, in addition to reduced human intervention. When IoT is augmented with sensors and actuators, the technology becomes an instance of the more general class of cyber-physical systems. Each device in the IoT is uniquely identifiable through its embedded computing system, but is able to interoperate within the existing Internet infrastructure. The growth of IoT devices has been profound, and coming years promise even-greater increases in the number of devices connected to the internet.

SUMMARY

A system includes a processor programmed to initiate executable operations. The executable operations include identifying an IoT apparatus in use by a user and that is communicatively linked to a mobile device used by the user. The executable operations also can include determining whether documentation for the IoT apparatus is located on the IoT apparatus or on the mobile device. The executable operations also can include, responsive to determining that the documentation for the IoT apparatus is located on the IoT apparatus or on the mobile device, determining whether the documentation for the IoT apparatus located on the IoT apparatus or on the mobile device is a latest version of the documentation. The executable operations also can include, responsive to determining that the documentation for the IoT apparatus located on the IoT apparatus or on the mobile device is not the latest version of the documentation, automatically accessing the latest version of the documentation from at least one resource external to the IoT apparatus and the mobile device. The executable operations also can include initiating presentation of at least a portion of the latest version of the documentation on a display.

A computer program includes a computer readable storage medium having program code stored thereon. The program code is executable by a processor to perform a method. The method includes identifying, by the processor, an IoT apparatus in use by a user and that is communicatively linked to a mobile device used by the user. The method also can include determining, by the processor, whether documentation for the IoT apparatus is located on the IoT apparatus or on the mobile device. The method also can include, responsive to determining that the documentation for the IoT apparatus is located on the IoT apparatus or on the mobile device, determining, by the processor, whether the documentation for the IoT apparatus located on the IoT apparatus or on the mobile device is a latest version of the documentation. The method also can include, responsive to determining that the documentation for the IoT apparatus located on the IoT apparatus or on the mobile device is not the latest version of the documentation, automatically accessing, by the processor, the latest version of the documentation from at least one resource external to the IoT apparatus and the mobile device. The method also can include initiating, by the processor, presentation of at least a portion of the latest version of the documentation on a display.

BRIEF DESCRIPTION OF THE DRAWINGS

FIG. 6 is a flow chart illustrating another example of a method of presenting apparatus documentation to a user.

DETAILED DESCRIPTION

Figure 1:
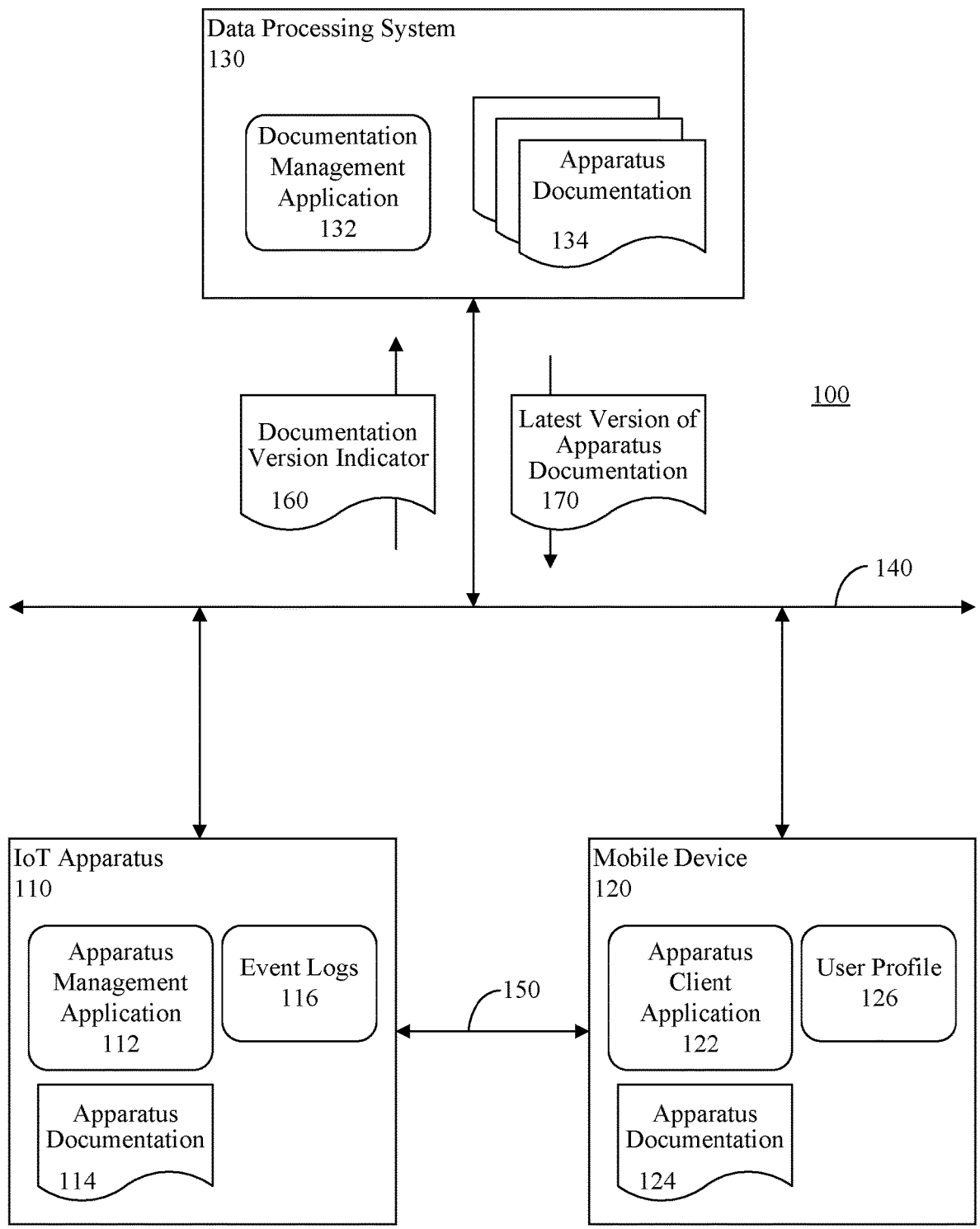
FIG. 1 is a block diagram illustrating an example of a network computing environment.

This disclosure relates to the Internet of Things (IoT), and more specifically, to IoT devices. In accordance with the inventive arrangements disclosed herein, use of an IoT apparatus by a user can be identified. The user may desire documentation related to use of the IoT apparatus, for example instructions on how to use the IoT apparatus or instructions on how to troubleshoot a problem with the IoT apparatus. A determination can be made as to whether the documentation for the apparatus is located on the IoT apparatus, or on a mobile device used by the user that is communicatively linked to the IoT apparatus. Responsive to determining that the documentation for the apparatus is located on the apparatus or on the mobile device, a determination can be made as to whether the documentation is a latest version of the documentation. If not, the latest version of the documentation from at least resource external to the apparatus and the mobile device, for example a data processing system (e.g., a server) that maintains documentation for the IoT apparatus.

At least a portion of the latest documentation can be presented to the user. For example, one or more documents contained in the documentation that are related to operations the user is attempting to initiate on the IoT apparatus can be presented to the user. Thus, rather than searching through all of the documentation to find the information the user needs, the user can be presented documents directly related to the operations on the IoT apparatus the user is trying to implement.

Further, the documentation can be presented to the user in a language preferred by the user. For example, assume the user is in a foreign country and documentation stored on the IoT apparatus is presented in a language native to that country. Also, assume that the language native to that country is not the user's preferred language. In accordance with the arrangements described herein, documentation written in the user's preferred language can be accessed and presented to the user, thus facilitating the user's understanding of the documentation. This can greatly improve the user's experience when interacting with the IoT apparatus.

Several definitions that apply throughout this document now will be presented.

As defined herein, the term "documentation" means at least one electronic file comprising at least one text document written in a human language. As defined herein, the term "human language" is a language spoken and/or written by human beings that is not a computer programming language (e.g., English, Spanish, Portuguese, German, Italian, French, Greek, Japanese, Korean, Russian, a Chinese dialect, etc.).

As used herein, the acronym "IoT" is an abbreviation of the term "Internet of Things."

As defined herein, the term "IoT apparatus" means at least one physical device that performs specialized functions and is identifiable in at least one communication network through an embedded computing system communicatively linked to one or more other devices/systems via the at least one communication network. As the term "IoT apparatus" is defined herein, a mobile device is not an IoT apparatus. As the term "IoT apparatus" is defined herein, a server, a workstation and a desktop computer are not IoT apparatuses. As the term "IoT apparatus" is defined herein, network infrastructure, such as routers, firewalls, switches, access points and the like, are not are not IoT apparatuses.

As defined herein, the term "mobile device" means a mobile processing system including at least one processor and memory that requests shared services from a server, and with which a user directly interacts. Examples of a mobile device include, but are not limited to, a mobile computer, a laptop computer, a netbook computer, a tablet computer, a smart phone, a personal digital assistant, a smart watch, smart glasses, and the like. Network infrastructure, such as routers, firewalls, switches, access points and the like, are not mobile devices as the term "mobile device" is defined herein.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "automatically" means without user intervention.

As defined herein, the term "user" means a person (i.e., a human being).

FIG. 1 is a block diagram illustrating an example of a network computing environment 100. The network computing environment 100 can include an IoT apparatus 110, a mobile device 120 and a data processing system 130 (e.g., a server). Examples of an IoT apparatus 110 can include, but are not limited to, appliances. Examples of appliances include, but are not limited to, audio equipment, clocks, refrigerators, clothes washing machines, clothes dryers, dishwashers, ovens, microwave ovens, refrigerators, BBQs and so on.

The IoT apparatus 110 can include at least one processor and memory configured to execute computer program code. The IoT apparatus 110 also can include an apparatus management application 112, which is executable by the processor to manage operation of the IoT apparatus 110 and perform other processes described herein. Optionally, the IoT apparatus 110 can store apparatus documentation 114 for the IoT apparatus 110. The IoT apparatus 110 also can store event logs 116. The apparatus management application 112 can store in the event logs 116 data indicating various events related to the IoT apparatus 110. Examples of such events can include, but are not limited to, user input operations, operations performed by the IoT apparatus 110, states of the IoT apparatus 110, and so on. The apparatus management application 112, event logs 116 and, optionally, apparatus documentation 114 can be stored to a computer readable storage medium of the IoT apparatus 110, for example, one or more bulk storage devices within the IoT apparatus 110 and/or one or more bulk storage devices communicatively linked to the IoT apparatus 110.

The mobile device 120 can include at least one processor and memory configured to execute computer program code. The mobile device also can include an apparatus client application 122, which is executable by the processor to perform various processes described herein. In one arrangement, the apparatus client application 122 can be a mobile application specifically configured to communicate with one or more IoT apparatuses, including the IoT apparatus 110. In another arrangement, the apparatus client application 122 can be a web browser configured to receive HTML and/or other computer programming code from the IoT apparatus 110 (e.g., the apparatus management application 112) and, based on such computer programming code, present a user interface for the IoT apparatus 110 with which the user can interact.

Optionally, the mobile device 120 can store apparatus documentation 124 for the IoT apparatus 110, which can be retrieved by the apparatus client application 122 from the IoT apparatus 110 and/or the data processing system 130. The apparatus client application 122 and, optionally, apparatus documentation 124 can be stored to a computer readable storage medium of the mobile device 120, for example, one or more bulk storage devices within the mobile device 120 and/or one or more bulk storage devices communicatively linked to the mobile device 120.

The data processing system 130 can include at least one processor and memory configured to execute computer program code. The data processing system 130 also can include a document management application 132 and can store apparatus documentation 134. Moreover, the apparatus documentation 134 can include various versions of the apparatus documentation 134, the various versions at least including latest versions of the apparatus documentation 134. The document management application 132 can manage the apparatus documentation 134, share the apparatus documentation 134 with the IoT apparatus 110 and/or Mobile device 120, as well as perform other processes described herein. The document management application 132 and apparatus documentation 134 can be stored to a computer readable storage medium of the data processing system 130, for example, one or more bulk storage devices within the data processing system 130 and/or one or more bulk storage devices communicatively linked to the data processing system 130.

The IoT apparatus 110 and/or the mobile device 120 can be communicatively linked to the data processing system 130 via a communication network 140. The communication network 140 is the medium used to provide communications links between various devices and data processing systems connected together within the network computing environment 100. The communication network 140 may include connections, such as wire, wireless communication links, or fiber optic cables. The communication network 140 can be implemented as, or include, any of a variety of different communication technologies such as a WAN, a LAN, a wireless network, a mobile network, a Virtual Private Network (VPN), the Internet, the Public Switched Telephone Network (PSTN), or similar technologies. In this regard, the communication network 140 can include the Internet.

Further, the mobile device 120 can be communicatively linked to the IoT apparatus 110 via at least one communication link 150. The at least one communication link 150 can include at least one near field communication (NFC) communication link and/or at least one personal area network (PAN) communication link. Examples of a NFC communication link include, but are not limited to, ISO/IEC 14443, FeliCa, ISO/IEC 18092, StoLPaN, and so on. Examples of a PAN communication link include, but are not limited to, a Bluetooth® communication link, a Bluetooth® low energy (BLE) communication link, a ZigBee™ communication link, a wireless USB communication link, an IrDA communication link, an Insteon® communication link, and so on.

The apparatus documentation 114, 124, 134 can include, in a human language understandable by a layman (e.g., a person without specialized knowledge of the IoT apparatus 110), information regarding operation and/or troubleshooting of the IoT apparatus 110. The apparatus documentation 134, however, may evolve over time, and thus the apparatus documentation 114 stored on the IoT apparatus 110 and/or the apparatus documentation 124 stored on the mobile device 120 may not be up to date with the apparatus documentation 134. For example, responsive to the IoT apparatus 110 being manufactured, the apparatus documentation 114 can be loaded into a computer readable storage medium of the IoT apparatus 110, and at that time the apparatus documentation 114 may correlate to the apparatus documentation 134.

Over time, however, the apparatus documentation 134 may be updated with new versions of the apparatus documentation, which may or may not be communicated to the IoT apparatus 110. Similarly, new versions of the apparatus documentation may or may not be communicated to the mobile device 120. Indeed, the mobile device 120 may not even include the apparatus documentation 124 until the mobile device 120 establishes the communication link 150 with the IoT apparatus 110. When the mobile device connects to the IoT apparatus 110, the mobile device 120 may receive from the IoT apparatus 110 the apparatus documentation 114 as the apparatus documentation 124, even though the apparatus documentation 114 may be out of date (i.e., not the latest version). Moreover, the apparatus documentation 114 may include documentation written in a particular human language (e.g., English, Spanish, Portuguese, German, Italian, French, Greek, Japanese, Korean, Russian, a Chinese dialect, etc.) spoken in a geographic region to which the IoT apparatus 110 is deployed, but a user of the IoT apparatus may not understand that particular human language.

Nonetheless, the arrangements described herein can ensure that the user is presented not only the latest version of the apparatus documentation 134, but also a version of the apparatus documentation 134 presented in a human language preferred by the user of the mobile device 120. Moreover, the arrangements describe herein can present to the user portions of the apparatus documentation 134 pertinent to operations of the IoT apparatus 110 the user desires to initiate. Thus, the arrangements described herein can greatly simplify the user's understanding of operation of the IoT apparatus 110, as well as simplify the guidance provided to the user in order to operate the IoT apparatus 110.

The arrangements described herein also can enable the IoT apparatus 110 to be configured for the user based on information gathered from the IoT apparatus 110, including recent events initiated by the user for the IoT apparatus 110, and/or user preferences of the user of the mobile device 120. For example, recent events initiated by the user for the IoT apparatus 110 can include an event in which the user selects one or more buttons and/or menu items presented by the IoT apparatus 110. Further, user preferences in the mobile device 120 can indicate a particular human language spoken by the user. Based on the recent events and the user preferences, the IoT apparatus 110 can present next buttons and/or menu items that follow the user selections and are presented in the particular human language spoken by the user. In this regard, via the communication link 150, the mobile device 120 can indicate to the IoT apparatus 110 the user's preferred human language.

In operation, the mobile communication device can communicatively link to the IoT apparatus 110 via the communication link 150. Via the communication link 150, the IoT apparatus 110 and/or the mobile device 120 can identify (e.g., determine) that the IoT apparatus 110 is in use by a user of the mobile device 120. For example, the apparatus management application 112 and/or the apparatus client application 122 can identify that the IoT apparatus 110 is in use by a user of the mobile device 120.

The apparatus management application 112 and/or the apparatus client application 122 can determine whether apparatus documentation 114 for the IoT apparatus 110 is located (e.g., stored) on the IoT apparatus 110. In another arrangement, the apparatus management application 112 and/or the apparatus client application 122 can determine whether apparatus documentation 114 for the IoT apparatus 110 is located (e.g., stored) on the mobile device 120. Responsive to determining that the documentation for the IoT apparatus 110 is located on the IoT apparatus and/or on the mobile device 120, the apparatus management application 112 and/or the apparatus client application 122 can determine whether the apparatus documentation 114, 124 is a latest version of the apparatus documentation.

In illustration, the apparatus management application 112 or the apparatus client application 122 can communicate to the document management application 132 a message 160 (e.g. a request). In one arrangement, the message 160 can indicate a version of the apparatus documentation 114 presently stored on the IoT apparatus 110 and/or a version of the apparatus documentation 124 presently stored on the mobile device 120. The documentation management application 132 can process the message 160 and determine whether the present version of the apparatus documentation 114 (or the present version of the apparatus documentation 124) is the latest version of the apparatus documentation. For example, the documentation management application 132 can compare the documentation version indicator contained in the message 160 to the latest version of the apparatus documentation 134.

In response to the message 160, the documentation management application 132 can communicate a message 170

(e.g., a response) to the IoT apparatus 110 or mobile device 120 from which the message 160 is received. The message 170 can indicate the latest version of the apparatus documentation 134. Further, the documentation management application 132 can interface with the apparatus management application 112 or the apparatus client application 122 to download the latest version of the apparatus documentation 134 to the IoT apparatus 110 or mobile device 120. The latest version of the apparatus documentation 134 can be stored as apparatus documentation 114 and/or apparatus documentation 124, for example to replace earlier versions of the apparatus documentation 114, 124, if present.

In response to the latest version of the apparatus documentation 134 being downloaded to the IoT apparatus 110, or in response to a user input to the IoT apparatus 110 or mobile device 120, the apparatus management application 112 can present to the user the latest version of the apparatus documentation 134, for example on a display of the IoT apparatus 110 or on a display of the Mobile device 120. In this regard, the apparatus management application 112 can interface with the apparatus client application 122 to initiate the mobile device 120 to present the latest version of the apparatus documentation 134. In another arrangement, in response to the latest version of the apparatus documentation 134 being downloaded to the mobile device 120, or in response to a user input to the IoT apparatus 110 or mobile device 120, the apparatus client application 122 can present to the user the latest version of the apparatus documentation 134, for example on a display of the mobile device 120.

In another arrangement, the message 160 need not indicate a version of the apparatus documentation 114, 124 presently stored on the IoT apparatus 110 and/or mobile device 120. Instead, the message 160 can request from the documentation management application 132 the latest version of the apparatus documentation 134. In response to the message 160, the documentation management application 132 interface with the apparatus management application 112 or the apparatus client application 122 to download the latest version of the apparatus documentation 134 to the IoT apparatus 110 and/or the mobile device 120. The IoT apparatus 110 and/or the mobile device 120 can present the latest version of the apparatus documentation 134 to the user as previously described.

For example, in some cases, the IoT apparatus 110 and/or mobile device 120 may not already have apparatus documentation 114, 124 stored locally. Thus, the IoT apparatus 110 and/or mobile device 120 can access the latest version of the apparatus documentation 134 from the data processing system 130 when the apparatus documentation 134 is to be presented to a user. In another example, the IoT apparatus 110 and/or mobile device 120 may already have apparatus documentation 114, 124 stored locally, but rather than documentation management application 132 determining whether the apparatus documentation 114, 124 is the latest version, the IoT apparatus 110 and/or mobile device 120 can make such determination by comparing a version identifier for the apparatus documentation 134 to a version identifier for the apparatus documentation 114, 124. If the apparatus documentation 114, 124 is the latest version, the IoT apparatus 110 and/or mobile device 120 can disregard the version of the apparatus documentation 134 downloaded from the data processing system 130. If, however, the apparatus documentation 114, 124 is not the latest version, the IoT apparatus 110 and/or mobile device 120 can replace the apparatus documentation 114, 124 with the apparatus documentation 134.

In some cases, the apparatus documentation 134 may contain multiple parts, or portions. The user of the IoT apparatus 110 may not need all of the portions. For example, the user may only desire to view portions of the apparatus documentation 134 that pertain to operations the user is attempting to perform with the IoT apparatus 110, or such desire can be inferred based on the operations. Accordingly, the present arrangements can select for presentation to the user only those portions of the latest version of the apparatus documentation 134 pertinent to the operations the user is attempting to perform.

In illustration, the apparatus management application 112 can monitor user inputs into the IoT apparatus 110 and/or the apparatus client application 122, and generate corresponding event data. In addition, the apparatus management application 112 can monitor operations and/or processes performed by the IoT apparatus 110 in response to the user inputs, and generate corresponding event data. Further, the apparatus management application 112 can monitor operating states of the IoT apparatus 110 and generate corresponding event data. The apparatus management application 112 can store the event data in the event logs 116.

Further, the apparatus management application 112 can monitor the event logs 116 and analyze the event data. For example, the apparatus management application 112 can identify in the event data specific user inputs received from the user, processes/operations initiated in the IoT apparatus 110 in response to the user inputs, states of the IoT apparatus 110, and various other event information that may be available. The apparatus management application 112 can access a data table, which can be stored locally by the IoT apparatus 110 or stored by the data processing system 130. The data table, for example, can indicate correlations between various user inputs, various operations and various states of the IoT apparatus 110. The apparatus management application 112 can process the event data and the data table to at determine at least one operation the user is attempting to perform. The apparatus management application 112 can identify the at least one operation the user is attempting to perform as a target operation. The operations can be, for example, operations to use the IoT apparatus 110, operations to troubleshoot a problem with the IoT apparatus 110 and/or operations to access apparatus documentation.

Responsive to determining the operations the user is attempting to perform, the apparatus management application 112 can identify one or more documents contained in the apparatus documentation 114 pertaining to the operations. Such documents can be identified in the previously described data table, or in another data table indicating operations performed on and/or performed by the IoT apparatus 110, and indicating corresponding documents pertaining to such operations.

Further, the apparatus management application 112 can generate the message 160 previously described, but in this case indicate a version identifier for each of the identified documents. The documentation management application 132 can implement processes similar to those previously described to determine whether the identified documents are the latest versions of the documents, generate the message 170, and download the latest versions of the documents to the IoT apparatus 110. The IoT apparatus 110 can initiate presentation of the latest versions of the documents to the user as previously described.

In another arrangement, the apparatus client application 122 can perform the processes described above as being performed by the apparatus management application 112, and present the latest versions of the documents to the user.

In this regard, the apparatus client application 122 can access the event logs 116 from the IoT apparatus 110.

In a further aspect of the present arrangements, the message 160 can indicate a preferred language (i.e., human language) of the user. The preferred language can be indicated in a user profile 126 for the user stored on the mobile device 120. In an arrangement in which the apparatus management application 112 generates the message 160, the apparatus client application 122 can communicate to the apparatus management application 112, via the communication link 150, a message indicating the preferred language. Responsive to receiving the message 160, the documentation management application 132 can download to the IoT apparatus 110 and/or the mobile device 120 the latest version of the apparatus documentation 134, or portions thereof, written in the user's preferred language. In some cases, the apparatus documentation 114, 124 stored by the IoT apparatus 110 or mobile device 120 may already be the latest version of the apparatus documentation 134, but may be written in a language that is not preferred by the user. Nonetheless, the above processes still can be performed to present to the user the apparatus documentation 134 in the language preferred by the user, regardless of whether the apparatus documentation 114, 124 is written in the language preferred by the user.

In illustration, assume the user travels to a foreign country and attempts to use the IoT apparatus 110. Because the IoT apparatus 110 is in that foreign country, the apparatus documentation 114 stored on the IoT apparatus 110 may be written in a language native to that country. Moreover, instructions on labels and/or manuals associated with the IoT apparatus 110 in a language native to that country. The user may not be completely fluent in that language. Notwithstanding, by presenting to the user the apparatus documentation 134 in the user's preferred language, the present arrangements can make it much easier for the user to read and understand the apparatus documentation 134, and thus aid the user in operating the IoT apparatus 110.

Figure 2:
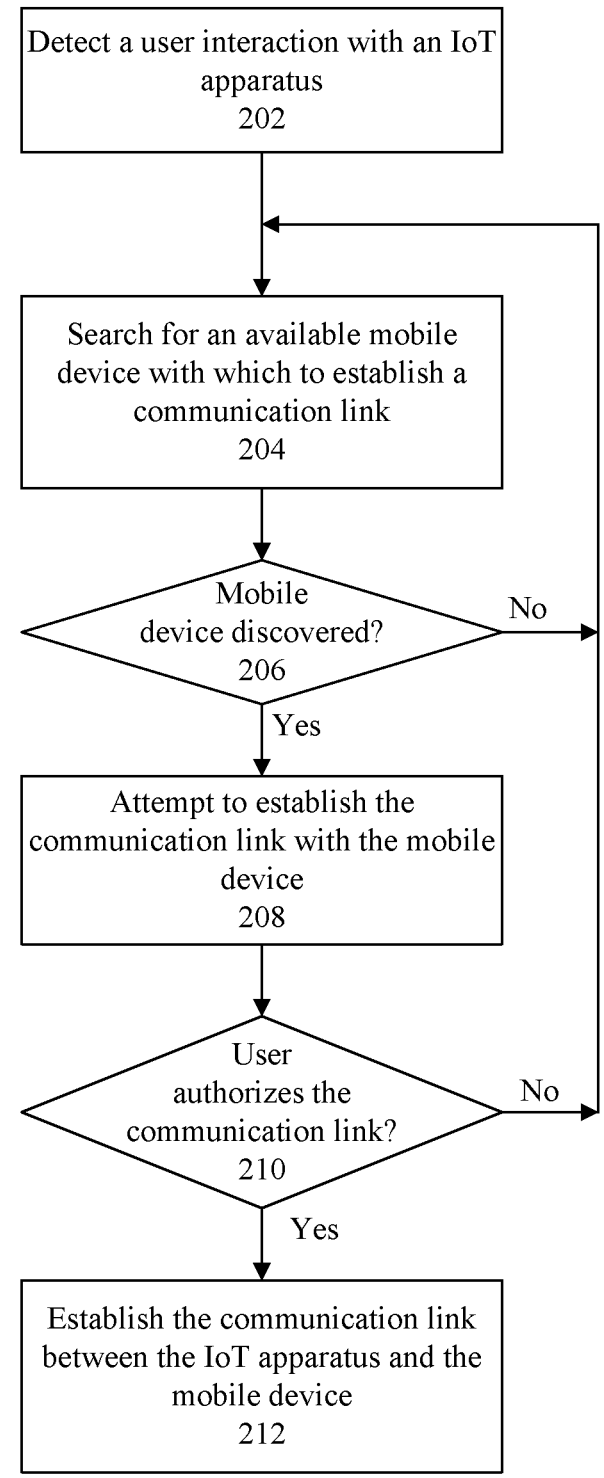
FIG. 2 is a flow chart illustrating an example of a method of establishing a communication link between an IoT apparatus and a mobile device.

FIG. 2 is a flow chart illustrating an example of a method 200 of establishing a communication link (e.g., the communication link 150) between an IoT apparatus and a mobile device. The method 200 can be implemented by the IoT apparatus 110 of FIG. 1.

At step 202, the IoT apparatus 110 can detect a user interaction with the IoT apparatus 110. At step 204, the IoT apparatus 110 can search for an available mobile device with which to establish a communication link, such as the mobile device 120. At decision box 206, the IoT apparatus can determine whether a mobile device is discovered. In not, the process can return to step 204.

If at decision box 206 a mobile device is discovered (e.g., the mobile device 120), the process can proceed to step 208. At step 208, the IoT apparatus 110 can attempt to establish a communication link with the mobile device. In illustration, the IoT apparatus 110 can implement a pairing protocol, such as a PAN paring protocol or a NFC pairing protocol, which are well known in the art. During the pairing protocol, the mobile device 120 can prompt the user to indicate whether the user authorizes the communication link.

Proceeding to decision box 210, if the user does not authorize the communication link, the process can return to step 204. If, however, the user does authorize the communication link, the process can proceed to step 212. At step 212, the IoT apparatus 110 can establish a communication link between the IoT apparatus 110 and the mobile device 120.

Optionally, responsive to the communication link being established, the IoT apparatus 110 (e.g., the apparatus management application 112) can communicate, via the communication link, a message to the mobile device 120 initiating the mobile device 120 to present the apparatus client application 122. Further, the IoT apparatus 110 can communicate to the mobile device 120 data to be presented to the user by the apparatus client application 122. In an arrangement in which the apparatus client application 122 is a web browser, the he IoT apparatus 110 can communicate to the mobile device 120 HTML and/or other computer programming code the web browser can process to present a user interface to the user for interacting with the IoT apparatus 110.

Figure 3:
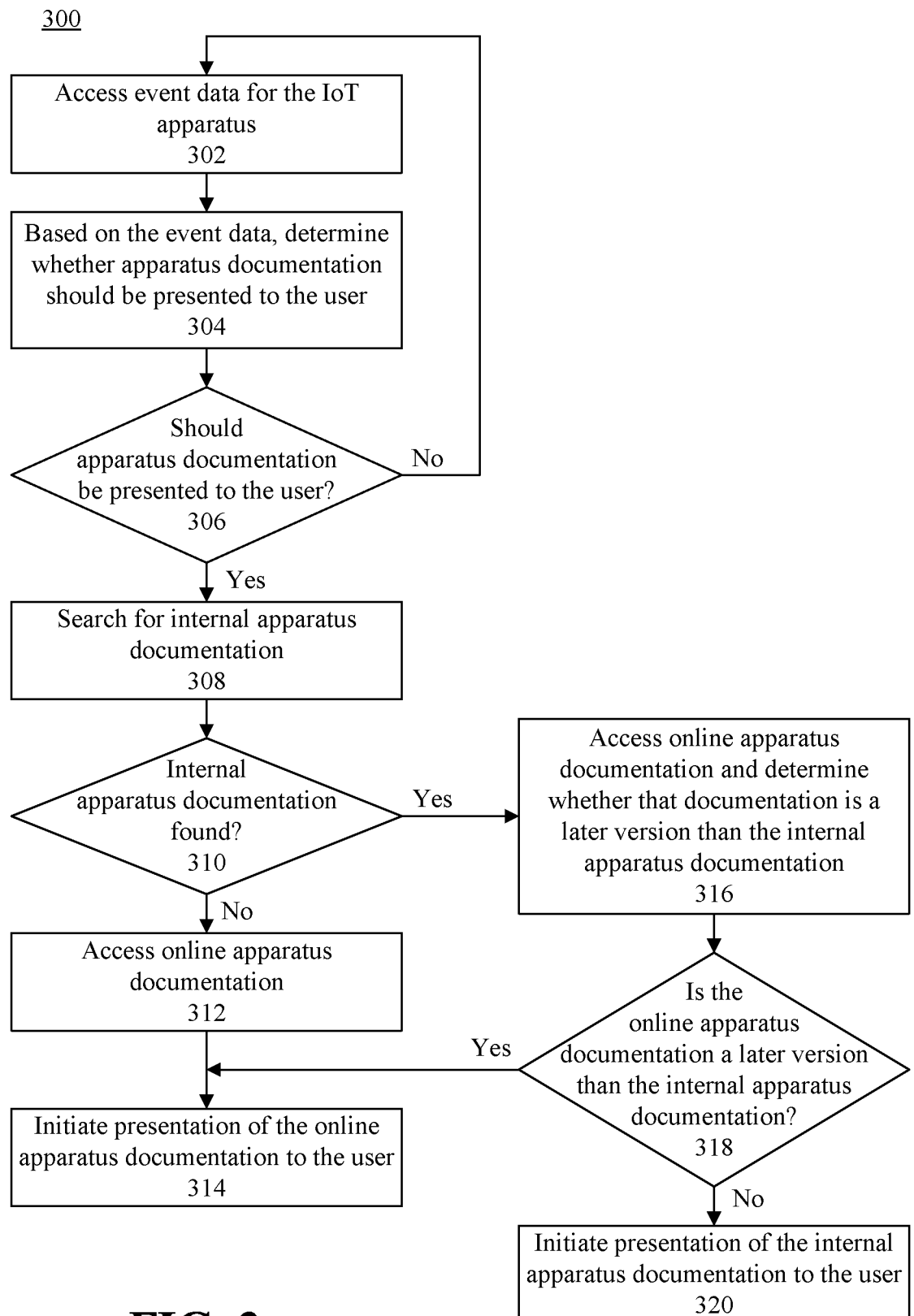
FIG. 3 is a flow chart illustrating an example of a method of presenting apparatus documentation to a user.

FIG. 3 is a flow chart illustrating an example of a method 300 of presenting apparatus documentation to a user. The method 300 can be implemented by the IoT apparatus 110 (e.g., the apparatus management application 112) or the mobile device 120 (e.g., the apparatus client application 122) of FIG. 1, for example responsive to a communication link being established between the IoT apparatus 110 and the mobile device 120. In the following description, the method 300 is described as being implemented by the apparatus management application 112, but it will be understood that the method 300 may be performed by the apparatus client application 122. In this regard, the apparatus client application 122 can access from the IoT apparatus 110, via the communication link 150, certain data processed by the apparatus client application 122 to implement the method 300, for example event data, etc.

At step 302, the apparatus management application 112 can access event data for the IoT apparatus 110, for example from event logs 116. The event data can indicate one or more user inputs received by the IoT apparatus 110 (e.g., user interaction with the IoT apparatus 110), operations performed by the IoT apparatus 110 in response to the user input(s), a state (e.g., an operational state) of the IoT apparatus 110, and so on. At step 304, the apparatus management application 112 can determine, based on the event data, whether apparatus documentation for the IoT apparatus 110 should be presented to the user. For example, if the event data indicates that the user is not properly operating the IoT apparatus 110, indicates the user may be having trouble operating the IoT apparatus 110, or indicates that the user has requested to view apparatus documentation for the IoT apparatus 110, the apparatus management application 112 can determine that the apparatus documentation should be presented to the user.

Proceeding to decision box 306, if the apparatus management application 112 determines the apparatus documentation need not be presented to the user, the process can return to step 302. If, however, the apparatus management application 112 determines the apparatus documentation should be presented to the user, the process can proceed to step 308. At step 308, the apparatus management application 112 can search for internal apparatus documentation stored locally on the IoT apparatus 110 or the mobile device 120. At decision box 310, if internal apparatus documentation is not found, the process can proceed to step 312.

At step 312, the apparatus management application 112 can access online apparatus documentation, for example by accessing apparatus documentation from the data processing system 130. At step 314, the apparatus management application 112 can initiate presentation of the online apparatus documentation to the user, for example via a display of the IoT apparatus 110 and/or via a display of the mobile device 120. To initiate presentation of the online apparatus documentation via the mobile device 120, the apparatus management application 112 can interface with the apparatus client application 122 of the mobile device 120 via the communication link 150.

Referring again to decision box 310, if internal apparatus documentation is found, the process can proceed to step 316. At step 316, the apparatus management application 112 can access online apparatus documentation, for example by accessing apparatus documentation from the data processing system 130, and determine whether that documentation is a later version than the internal apparatus documentation. Referring to decision box 318, if the online apparatus documentation is a later version than the internal apparatus documentation, the process can proceed to step 314, and the apparatus management application 112 can present the online apparatus documentation to the user. If, however, the online apparatus documentation is not a later version than the internal apparatus documentation, the process can proceed to step 320. At step 320, the apparatus management application 112 can initiate presentation of the internal apparatus documentation to the user, for example via a display of the IoT apparatus 110 and/or via a display of the mobile device 120. To initiate presentation of the internal apparatus documentation via the mobile device 120, the apparatus management application 112 can interface with the apparatus client application 122 of the mobile device 120 via the communication link 150.

Figure 4:
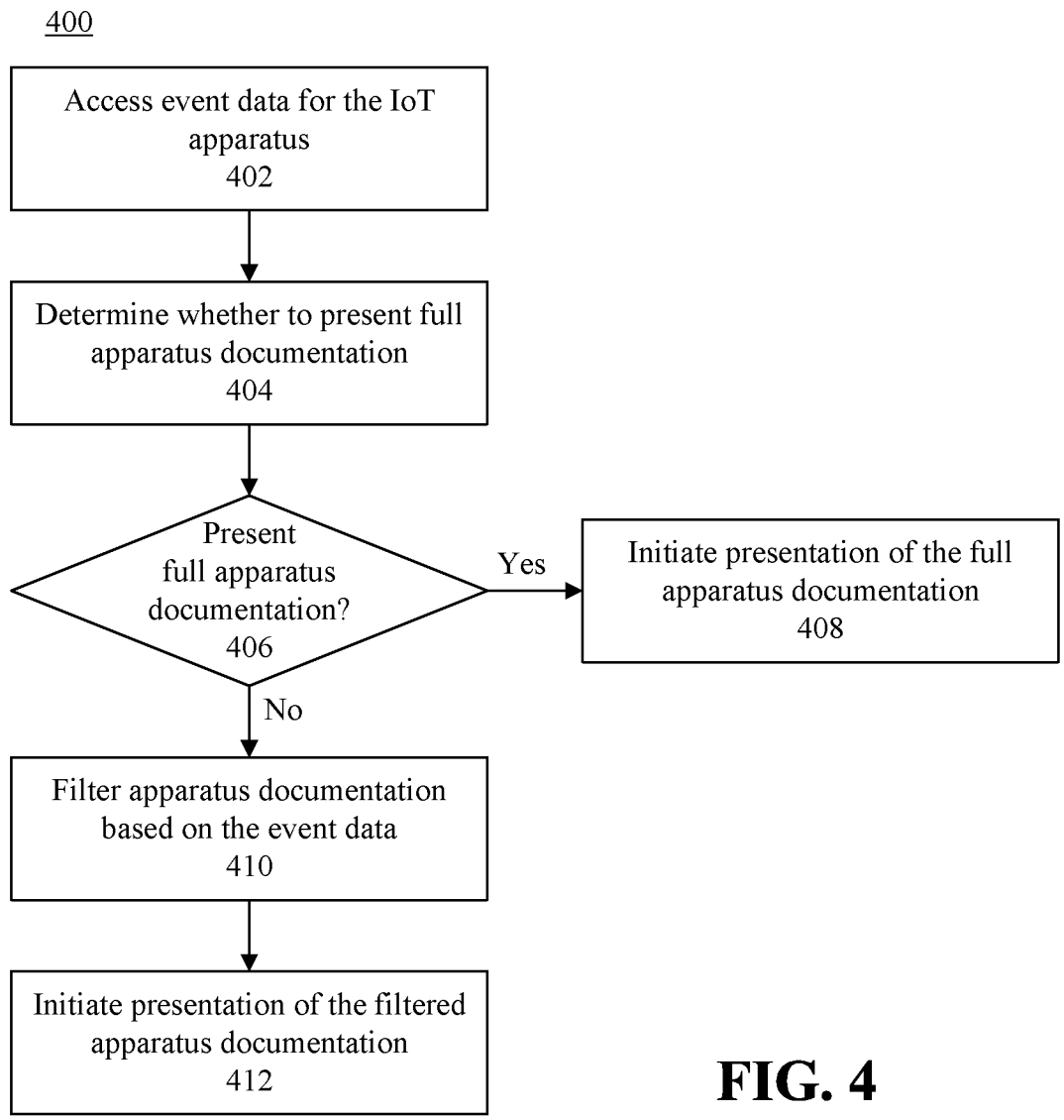
FIG. 4 is a flow chart illustrating another example of a method of presenting apparatus documentation to a user.

FIG. 4 is a flow chart illustrating another example of a method 400 of presenting apparatus documentation to a user. The method 400 can be implemented by the IoT apparatus 110 (e.g., the apparatus management application 112) or the mobile device 120 (e.g., the apparatus client application 122) of FIG. 1, for example responsive to a communication link being established between the IoT apparatus 110 and the mobile device 120. In the following description, the method 400 is described as being implemented by the apparatus management application 112, but it will be understood that the method 400 may be performed by the apparatus client application 122. In this regard, the apparatus client application 122 can access from the IoT apparatus 110, via the communication link 150, certain data processed by the apparatus client application 122 to implement the method 400, for example event data, etc.

At step 402, the apparatus management application 112 can access event data for the IoT apparatus 110, for example from event logs 116. The event data can indicate one or more user inputs received by the IoT apparatus 110 (e.g., user interaction with the IoT apparatus 110), operations performed by the IoT apparatus 110 in response to the user input(s), a state (e.g., an operational state) of the IoT apparatus 110, and so on.

At step 404, the apparatus management application 112 can determine whether to present complete apparatus documentation to the user. Such decision can be based on the nature of the event data. For example, if latest of the event data (i.e., a threshold number of most recent events detected by the IoT apparatus 110) indicates the user is attempting to use a particular feature, process or function of the IoT apparatus 110, the apparatus management application 112 can determine that only a portion of the available apparatus documentation, for instance one or more documents contained in the apparatus documentation, only need to be presented to the user. The determined document(s) can be that/those document(s) contained in the apparatus documentation that pertain to the at least one operation that pertain to the operation(s) the user is attempting to perform.

If, however, the latest event data indicates that the user is attempting to troubleshoot the IoT apparatus 110, for example to repair the IoT apparatus 110, or the specific feature, process or function of the IoT apparatus 110 the user is attempting to use is unclear from the event data, the apparatus management application 112 can determine that the complete apparatus documentation should be presented to the user. The complete apparatus documentation can include all available documentation related to operation and/or trouble shooting of the IoT apparatus 110 that is written in a language preferred by the user. Selection of apparatus documentation written in a language preferred by the user is discussed with respect to FIG. 5. In another arrangement, if the event data indicates that the user is attempting to troubleshoot the IoT apparatus 110, the apparatus management application 112 can determine that only a portion of the apparatus documentation relating to trouble shooting and/or repair only need to be presented to the user.

Proceeding to decision box 406, if the apparatus management application 112 determines that the complete apparatus documentation is to be presented, at step 408 the apparatus management application 112 can initiate presentation of the complete apparatus documentation. For example, the apparatus management application 112 can present the complete apparatus documentation via a display of the IoT apparatus 110 or via the mobile device 120, for example as previously described.

Referring again to decision box 406, if the apparatus management application 112 determines that the complete apparatus documentation need not be presented, at step 410 the apparatus management application 112 can filter the apparatus documentation based on the event data to select only a portion of the apparatus documentation. For example, the apparatus management application 112 can select one or more documents contained in the apparatus documentation as previously described with respect to FIG. 1. At step 412, the apparatus management application 112 can initiate presentation of the filtered (i.e., selected) portion of the apparatus documentation. For example, the apparatus management application 112 can present the filtered (i.e., selected) apparatus documentation via a display of the IoT apparatus 110 or via the mobile device 120, for example as previously described.

Figure 5:
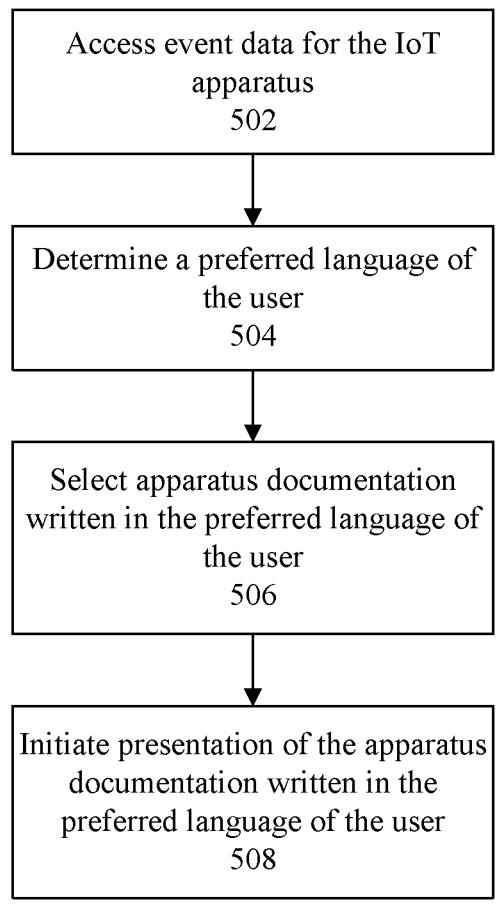
FIG. 5 is a flow chart illustrating another example of a method of presenting apparatus documentation to a user.

FIG. 5 is a flow chart illustrating another example of a method 500 of presenting apparatus documentation to a user. The method 500 can be implemented by the IoT apparatus 110 (e.g., the apparatus management application 112) or the mobile device 120 (e.g., the apparatus client application 122) of FIG. 1, for example responsive to a communication link being established between the IoT apparatus 110 and the mobile device 120. In the following description, the method 500 is described as being implemented by the apparatus management application 112, but it will be understood that the method 500 may be performed by the apparatus client application 122. In this regard, the apparatus client application 122 can access from the IoT apparatus 110, via the communication link 150, certain data processed by the apparatus client application 122 to implement the method 500, for example event data, etc.

At step 502, the apparatus management application 112 can access event data for the IoT apparatus 110, for example from event logs 116. The event data can indicate one or more user inputs received by the IoT apparatus 110 (e.g., user interaction with the IoT apparatus 110), operations performed by the IoT apparatus 110 in response to the user input(s), a state (e.g., an operational state) of the IoT apparatus 110, and so on.

At step 504, the apparatus management application 112 can determine a preferred language of the user. For example, the apparatus management application 112 can communicate to the mobile device 120 (e.g., the apparatus client application 122), via the communication link 150, a message requesting an indication of the preferred language of the user. In response, the mobile device 120 can access a user profile of the user to determine the preferred language, and communicate a response message to the apparatus management application 112 via the communication link 150. The response message can indicate the preferred language of the user. In another arrangement, the apparatus management application 112 can prompt the user to select a preferred language via a display of the IoT apparatus 110 or a display of the mobile device 120. In the case that the user is prompted via the display of the IoT apparatus 110, the user can select one or more buttons or keys on the IoT apparatus 110 to make the preferred language selection. In the case that the user is prompted via the display of the mobile device 120, the apparatus management application 112 can communicate information pertaining to the prompt to the mobile device 120 via the communication link 150. In response, the apparatus client application 122 can present the prompt to the user. Responsive to receiving the user's selection, the apparatus client application 122 can communicate data indicating the user's selection to the apparatus management application 112 via the communication link 150.

At step 506, the apparatus management application 112 can select apparatus documentation written in the preferred language of the user. At step 508, the apparatus management application 112 can initiate presentation of the selected apparatus documentation to the user, for example as previously described.

FIG. 6 is a flow chart illustrating another example of a method 600 of presenting IoT apparatus documentation to a user. The method 600 can be implemented by the IoT apparatus 110 (e.g., the IoT apparatus management application 112) or the mobile device 120 (e.g., the IoT apparatus client application 122) of FIG. 1, for example responsive to a communication link being established between the IoT apparatus 110 and the mobile device 120. In the following description, the method 600 is described as being implemented by the IoT apparatus management application 112, but it will be understood that the method 600 may be performed by the IoT apparatus client application 122. In this regard, the IoT apparatus client application 122 can access from the IoT apparatus 110, via the communication link 150, certain data processed by the IoT apparatus client application 122 to implement the method 600, for example event data, etc.

At step 602, the IoT apparatus management application 112 can identify an IoT apparatus in use by a user and that is communicatively linked to a mobile device used by the user. For example, the IoT apparatus management application 112 can identify the user using the IoT apparatus 110 based on one or more user inputs received by the IoT apparatus 110 from the user or by identifying a communication link established between the IoT apparatus and a mobile device (e.g., the mobile device 120) used by the user. The communication link can be a personal are network (PAN) communication link and/or a near filed communication (NFC) link.

At step 604, the IoT apparatus management application 112 can determine whether documentation for the IoT apparatus is located on the IoT apparatus or on the mobile device. The mobile device can be communicatively linked to the IoT apparatus via a PAN communication link and/or a NFC communication link. At step 606, the IoT apparatus management application 112 can, responsive to determining that the documentation for the IoT apparatus is located on the IoT apparatus or on the mobile device, determine whether the documentation for the IoT apparatus located on the IoT apparatus or on the mobile device is a latest version of the documentation. At step 608, the IoT apparatus management application 112 can, responsive to determining that the documentation for the IoT apparatus located on the IoT apparatus or on the mobile device is not the latest version of the documentation, automatically access, using a processor, the latest version of the documentation from at least one resource external to the IoT apparatus and the mobile device. The resource can be a data processing system, such as a server. At step 610, the IoT apparatus management application 112 can initiate presentation of at least a portion of the latest version of the documentation on a display.

Figure 7:
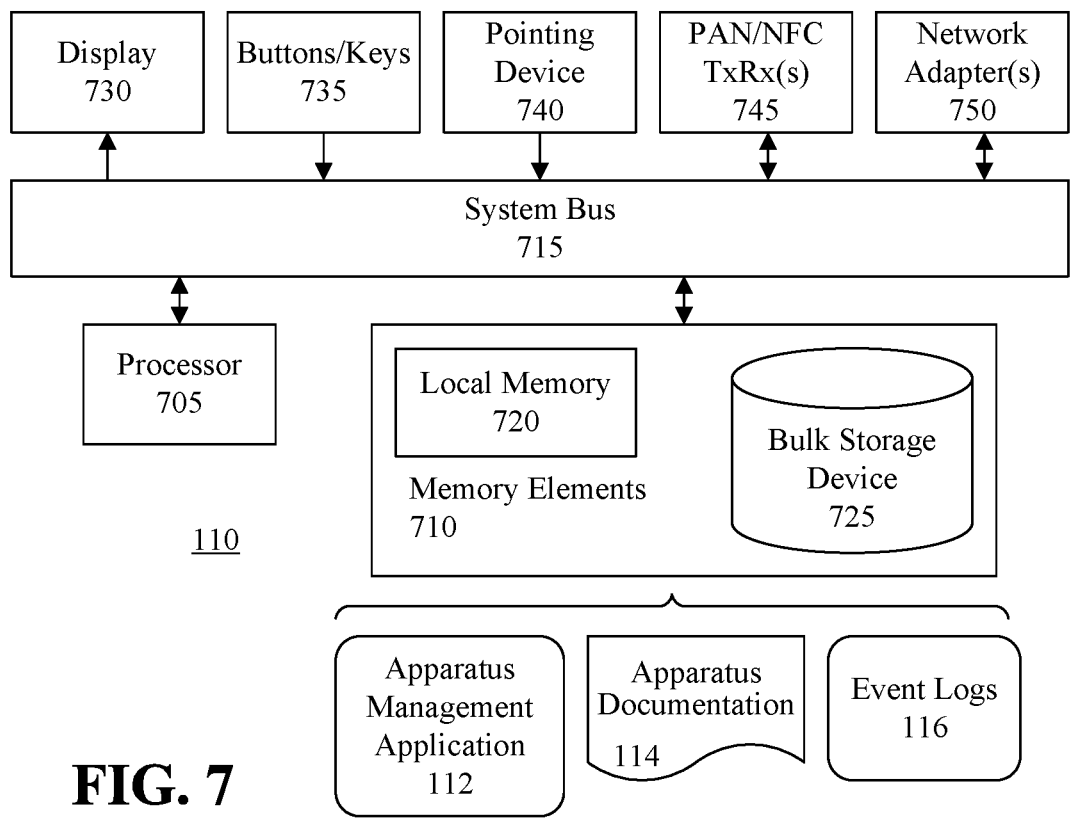
FIG. 7 is a block diagram illustrating example architecture for an IoT apparatus.

FIG. 7 is a block diagram illustrating example architecture for an IoT apparatus 110 of FIG. 1. The IoT apparatus 110 can include at least one processor 705 (e.g., a central processing unit) coupled to memory elements 710 through a system bus 715 or other suitable circuitry. As such, the IoT apparatus 110 can store program code within the memory elements 710. The processor 705 can execute the program code accessed from the memory elements 710 via the system bus 715.

The memory elements 710 can include one or more physical memory devices such as, for example, local memory 720 and one or more bulk storage devices 725. Local memory 720 refers to random access memory (RAM) or other non-persistent memory device(s) generally used during actual execution of the program code. The bulk storage device(s) 725 can be implemented as a hard disk drive (HDD), solid state drive (SSD), or other persistent data storage device. The IoT apparatus 110 also can include one or more cache memories (not shown) that provide temporary storage of at least some program code in order to reduce the number of times program code must be retrieved from the bulk storage device 725 during execution.

Input/output (I/O) devices such as a display 730, buttons/keys 735 (e.g., physical buttons/keys and/or virtual buttons/keys presented on the display 730) and, optionally, a pointing device 770 can be coupled to the IoT apparatus 110. The I/O devices can be coupled to the IoT apparatus 110 either directly or through intervening I/O controllers. The display can be, for example, a touchscreen, an LCD display, a segmented display, or any other type of display suitable for use with an IoT apparatus.

One or more PAN/NFC transceivers 745 also can be coupled to IoT apparatus 110 to enable the IoT apparatus 110 to become coupled to mobile devices via PAN and/or NFC communication links. Further, one or more network adapters 750 also can be coupled to IoT apparatus 110 to enable the IoT apparatus 110 to become coupled to other systems, computer systems, remote printers, and/or remote storage devices through intervening private and/or public networks. Modems, cable modems, transceivers, and Ethernet cards are examples of different types of network adapters 750 that can be used with the IoT apparatus 110.

As pictured in FIG. 7, the memory elements 710 can store the components of the IoT apparatus 110, namely the apparatus management application 112, the apparatus documentation 114 and the event logs 116. Being implemented in the form of executable program code, the apparatus management application 112 can be executed by the IoT apparatus 110 and, as such, can be considered part of the IoT apparatus 110. Moreover, the apparatus management application 112, apparatus documentation 114 and event logs 116 are functional data structures that impart functionality when employed as part of the IoT apparatus 110.

Figure 8:
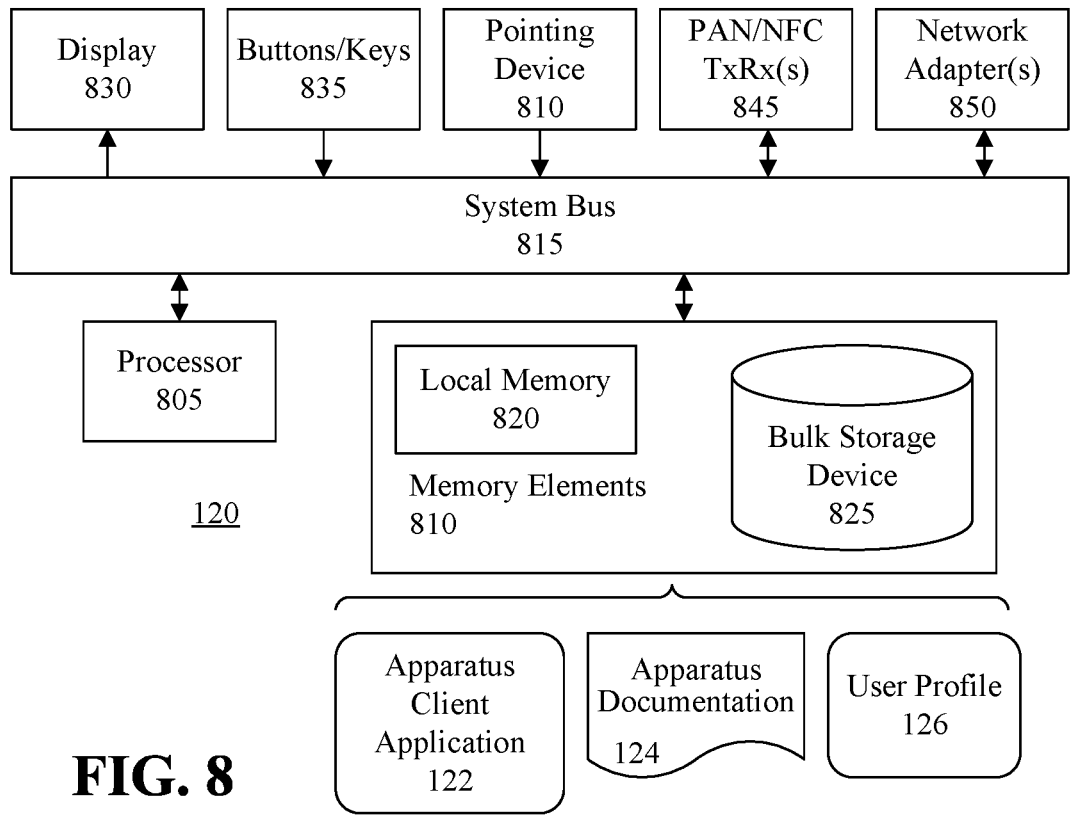
FIG. 8 is a block diagram illustrating example architecture for a mobile device.

FIG. 8 is a block diagram illustrating example architecture for the mobile device 120 of FIG. 1. The Mobile device 120 can include at least one processor 805 (e.g., a central processing unit) coupled to memory elements 810 through a system bus 815 or other suitable circuitry. As such, the Mobile device 120 can store program code within the memory elements 810. The processor 805 can execute the program code accessed from the memory elements 810 via the system bus 815.

The memory elements 810 can include one or more physical memory devices such as, for example, local memory 820 and one or more bulk storage devices 825. The Mobile device 120 also can include one or more cache memories (not shown) that provide temporary storage of at least some program code in order to reduce the number of times program code must be retrieved from the bulk storage device 825 during execution.

Input/output (I/O) devices such as a display 830, buttons/keys 835 (e.g., physical buttons/keys and/or virtual buttons/keys presented on the display 830) and, optionally, a pointing device 840 can be coupled to the Mobile device 120. The I/O devices can be coupled to the Mobile device 120 either directly or through intervening I/O controllers. One or more PAN/NFC transceivers 845 also can be coupled to Mobile device 120 to enable the Mobile device 120 to become coupled to other devices (e.g., the IoT apparatus 110) via PAN and/or NFC communication links. Further, one or more network adapters 850 also can be coupled to Mobile device 120 to enable the Mobile device 120 to become coupled to other systems, computer systems, remote printers, and/or remote storage devices through intervening private and/or public networks. Modems, cable modems, transceivers, and Ethernet cards are examples of different types of network adapters 850 that can be used with the Mobile device 120.

As pictured in FIG. 8, the memory elements 810 can store the components of the Mobile device 120, namely the apparatus client application 122, the apparatus documentation 124 and the user profile 126. Being implemented in the form of executable program code, the apparatus client application 122 can be executed by the Mobile device 120 and, as such, can be considered part of the Mobile device 120. Moreover, the apparatus client application 122, apparatus documentation 124 and user profile 126 are functional data structures that impart functionality when employed as part of the Mobile device 120.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor programmed to initiate executable operations comprising:
identifying an IoT apparatus in use by a user and that is communicatively linked to a mobile device used by the user;
determining whether documentation for the IoT apparatus is located on the IoT apparatus or on the mobile device;
responsive to determining that the documentation for the IoT apparatus is located on the IoT apparatus or on the mobile device, determining whether the documentation for the IoT apparatus located on the IoT apparatus or on the mobile device is a latest version of the documentation;

responsive to determining that the documentation for the IoT apparatus located on the IoT apparatus or on the mobile device is not the latest version of the documentation, automatically accessing the latest version of the documentation from at least one resource external to the IoT apparatus and the mobile device; and initiating presentation of at least a portion of the latest version of the documentation on a display.

2. The system of claim 1, the executable operations further comprising:

identifying at least one operation the user is attempting to perform by accessing event data indicating at least one latest event of the IoT apparatus and analyzing the event data; and based on analyzing the event data indicating the at least one latest event, identifying at least one document pertaining to the at least one operation the user is attempting to perform;

wherein the portion of the latest version of the documentation comprises the at least one document pertaining to the at least one operation the user is attempting to perform.

3. The system of claim 2, the executable operations further comprising:

based on analyzing the event data indicating the at least one latest event, determining whether to present a complete version of the latest version of the documentation or to present only the portion of the latest version of the documentation comprising the at least one document pertaining to the at least one operation the user is attempting to perform; and wherein the initiating presentation of at least the portion of the latest version of the documentation on the display comprises initiating presentation on the display of only the at least one document pertaining to the at least one operation the user is attempting to perform and further is responsive to determining to present only the portion of the latest version of the documentation comprising the at least one document pertaining to the at least one operation the user is attempting to perform.

4. The system of claim 2, wherein the at least one latest event is at least one user input received by the IoT apparatus.

5. The system of claim 1, the executable operations further comprising:

determining a human language preferred by the user of the mobile device; and selecting the latest version of the documentation to be a version written in the human language preferred by the user of the mobile device.

6. The system of claim 1, wherein the mobile device used by the user is communicatively linked to the IoT apparatus via a personal area network communication link.

7. The system of claim 1, wherein the mobile device used by the user is communicatively linked to the IoT apparatus via a near field communication link.

8. A computer program product comprising a computer readable storage medium having program code stored thereon, the program code executable by a processor to perform a method comprising:

identifying, by the processor, an IoT apparatus in use by a user and that is communicatively linked to a mobile device used by the user;

determining, by the processor, whether documentation for the IoT apparatus is located on the IoT apparatus or on the mobile device;

responsive to determining that the documentation for the IoT apparatus is located on the IoT apparatus or on the mobile device, determining, by the processor, whether the documentation for the IoT apparatus located on the IoT apparatus or on the mobile device is a latest version of the documentation;

responsive to determining that the documentation for the IoT apparatus located on the IoT apparatus or on the mobile device is not the latest version of the documentation, automatically accessing, by the processor, the latest version of the documentation from at least one resource external to the IoT apparatus and the mobile device; and initiating, by the processor, presentation of at least a portion of the latest version of the documentation on a display.

9. The computer program product of claim 8, the method further comprising:

identifying at least one operation the user is attempting to perform by accessing event data indicating at least one latest event of the IoT apparatus and analyzing the event data; and based on analyzing the event data indicating the at least one latest event, identifying at least one document pertaining to the at least one operation the user is attempting to perform;

wherein the portion of the latest version of the documentation comprises the at least one document pertaining to the at least one operation the user is attempting to perform.

10. The computer program product of claim 9, the method further comprising:

based on analyzing the event data indicating the at least one latest event, determining whether to present a complete version of the latest version of the documentation or to present only the portion of the latest version of the documentation comprising the at least one document pertaining to the at least one operation the user is attempting to perform; and wherein the initiating presentation of at least the portion of the latest version of the documentation on the display comprises initiating presentation on the display of only the at least one document pertaining to the at least one operation the user is attempting to perform and further is responsive to determining to present only the portion of the latest version of the documentation comprising the at least one document pertaining to the at least one operation the user is attempting to perform.

11. The computer program product of claim 9, wherein the at least one latest event is at least one user input received by the IoT apparatus.

12. The computer program product of claim 8, the method further comprising:

determining a human language preferred by the user of the mobile device; and selecting the latest version of the documentation to be a version written in the human language preferred by the user of the mobile device.

13. The computer program product of claim 8, wherein the mobile device used by the user is communicatively linked to the IoT apparatus via a personal area network communication link or a near field communication link.

14. The computer program product of claim 8, wherein the mobile device used by the user is communicatively linked to the IoT apparatus via a near field communication link.

\* \* \* \* \*